H. F. KNAPP.
SKEE OR RUNNER.
APPLICATION FILED JAN. 4, 1915.
1,146,504.
Patented July 13, 1915.
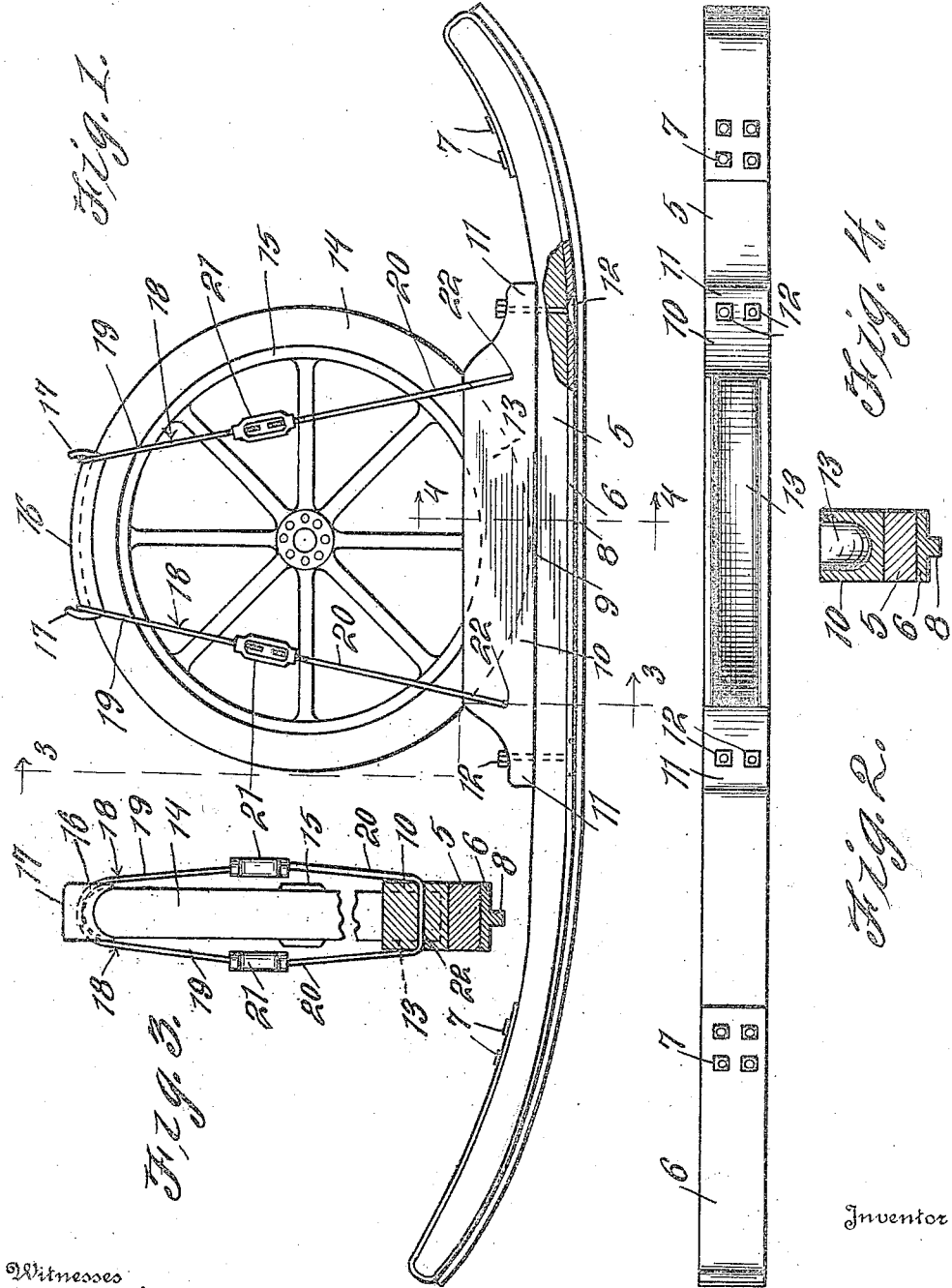
Witnesses
Wynne Johnson
Inventor
Henry F. Knapp
By C. L. Parker
Attorney

UNITED STATES PATENT OFFICE.

HENRY F. KNAPP, OF LEBANON, NEW HAMPSHIRE.

SKEE OR RUNNER.

1,146,504.

Specification of Letters Patent.

Patented July 13, 1915.

Application filed January 4, 1915. Serial No. 434.

*To all whom it may concern:*

Be it known that I, HENRY F. KNAPP, a citizen of the United States, residing at Lebanon, in the county of Grafton and State of New Hampshire, have invented certain new and useful Improvements in Skees or Runners, of which the following is a specification.

My invention relates to improvements in skees or runners to be secured to the forward or rear wheels of vehicles, such as wagons, automobiles or the like.

An important object of the invention is to provide means for holding or binding the skee or runner upon the elastic or pneumatic tire of a wheel, to utilize the elasticity of the tire, when propelling the vehicle.

A further object of the invention is to provide means of the above mentioned character, which is simple in construction, inexpensive to manufacture, strong, durable adjustable, and convenient in use.

Other objects and advantages of the invention will be apparent during the course of the following description.

In the accompanying drawings forming a part of this specification and in which like numerals are employed to designate like parts throughout the same, Figure 1 is a side elevation of a skee or runner, embodying my invention, applied to a wheel equipped with a pneumatic tire, Fig. 2 is a plan view of the same, removed from the wheel, with parts omitted, Fig. 3 is a transverse sectional view taken on line 3—3 of Fig. 1, and, Fig. 4 is a transverse sectional view taken on line 4—4 of Fig. 1.

In the drawings, wherein for the purpose of illustration is shown a preferred embodiment of my invention, the numeral 5 designates the body portion of the skee or runner, which is preferably formed of wood while the same may be formed of metal or other suitable material. Secured to the outer surface of the body portion 5 is a preferably metallic band 6, the ends of which are bent upwardly about the ends of the body portion 5 and secured thereto above the same, as shown at 7. As more clearly shown in Fig. 3, the band 6 is provided with a longitudinal rib 8, adapted to prevent skidding of the skee or runner.

There is mounted on the body portion 5, slightly rearwardly of its center, the wheel receiving block or member 10, which is preferably formed of wood, but may be formed of metal or any other suitable material. The wheel receiving block or member 10 has its ends 11 tapered, and apertured for receiving clamping bolts 12, passing through the body portion 5 and the band 6, for rigidly securing the block or member 10, to the body portion 5. As more clearly shown in Fig. 2, the block or member 10 is provided with a longitudinal recess 13, for receiving an elastic or pneumatic tire 14, carried by a wheel 15, as shown. This recess 13 is curved in longitudinal and transverse sections.

Means are provided to directly engage with the elastic or pneumatic tire 14, and having no engagement with the spokes or other portions of the wheel 15, for retaining the lower portion of the wheel within the recess 13. Such means comprises a cap or upper member 16, which is preferably formed of metal although the same may be made of wood or other suitable material. This cap is preferably curved in longitudinal and transverse sections to conform to the curvature of the elastic or pneumatic tire 14, and is provided at its ends with upstanding flanges or projections 17, for detachable engagement with the upper ends of the binding loops 18. These binding loops embody upper and lower approximately U-shaped elements 19 and 20, having their inner ends connected by turn buckles 21. It is thus apparent that the binding loops are longitudinally extensible and contractible, the lower elements 20 extending through apertures 22 in the end portions of the blocks 10 and being preferably pivotally connected therewith to be swung longitudinally thereof.

In the use of the skee or runner, the binding loops 18 are first swung away from each other to assume more or less horizontal positions, to permit of the tire carrying wheel being arranged within the recess 13. When this is done, the cap 16 is arranged upon the top of the elastic or pneumatic tire 14, preferably at a point diametrically opposite the block 10, and the binding loops 18 are swung upwardly so that the upper elements 19 will move over the flanges 17 and be disposed inwardly thereof. The turn buckles 21 are now rotated to contract the binding loops, whereby they will snugly engage with the cap 16 inwardly of the flanges 17. The binding loops are now under suitable tension and are slightly angularly arranged, their points 22 of connection with the block 10 being arranged outwardly of the flanges 17, as shown.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. The combination with a runner provided upon its upper side with a recess to receive a portion of an elastic tire of a wheel, of a cap to engage with the upper portion of the elastic tire, and rods arranged upon opposite sides of the wheel and connecting the runner and cap without engaging with the wheel or parts thereof.

2. The combination with a runner provided upon its upper side with a recess to receive a portion of an elastic tire of a wheel, of a cap adapted to engage with the upper portion of the tire, and longitudinally extensible and contractible binding loops pivotally connected with the runner and adapted to be swung into and out of engagement with the cap.

3. The combination with a runner, of a block secured thereto and provided with a recess to receive a portion of the elastic tire of a wheel, a cap adapted to be arranged upon the upper portion of the wheel, and rods connecting the block and cap and being free from engagement with the wheel or parts thereof.

4. The combination with a runner, of a block secured thereto and provided with a longitudinally extending recess for receiving the lower portion of an elastic tire of a wheel, a cap adapted to be arranged upon the upper portion of the elastic tire, and longitudinally extensible and contractible binding members engaging the block and cap.

5. The combination with a runner, of a block secured thereto and provided with a longitudinal recess for receiving the lower portion of a pneumatic tire of a wheel, a cap adapted to engage with the upper portion of the tire and provided with transverse flanges, and longitudinally extensible and contractible binding loops pivotally connected with the block and adapted to engage with the cap.

6. The combination with a runner, of a block secured thereto and provided with a longitudinal recess for receiving a portion of a pneumatic tire of a wheel, a cap adapted to engage with the upper portion of the tire, binding elements secured to the block, coacting binding elements carried by the cap, and turn buckles adjustably connecting the adjacent ends of the elements.

In testimony whereof I affix my signature in presence of two witnesses.

HENRY F. KNAPP.

Witnesses:
  ROMEO E. PAINCHAUD,
  FRANCES F. FIRMIN.